H. W. GADDESS.
VENTILATOR.
APPLICATION FILED JAN. 9, 1920.

1,375,378.

Patented Apr. 19, 1921.
3 SHEETS—SHEET 1.

Inventor
Harry W. Gaddess

By J. J. Lawling.
Attorney

H. W. GADDESS.
VENTILATOR.
APPLICATION FILED JAN. 9, 1920.

1,375,378.

Patented Apr. 19, 1921
3 SHEETS—SHEET 2.

Inventor
Harry W. Gaddess
By J. J. Dowling
Attorney

H. W. GADDESS.
VENTILATOR.
APPLICATION FILED JAN. 9, 1920.

1,375,378.

Patented Apr. 19, 1921.
3 SHEETS—SHEET 3.

Inventor
Harry W. Gaddess
By
Attorney

UNITED STATES PATENT OFFICE.

HARRY W. GADDESS, OF BALTIMORE, MARYLAND.

VENTILATOR.

1,375,378. Specification of Letters Patent. Patented Apr. 19, 1921.

Application filed January 9, 1920. Serial No. 350,378.

*To all whom it may concern:*

Be it known that I, HARRY W. GADDESS, a citizen of the United States of America, residing at Baltimore, State of Maryland, have invented certain new and useful Improvements in Ventilators, of which the following is a specification.

This invention relates to certain new and useful improvements in ventilators particularly adapted for use in wall openings and windows for the admission of fresh air into buildings and the automatic exclusion of gusts of wind likely to cause drafts and other objectionable results.

The primary object of the invention is to improve upon the type of ventilator shown and described in my U. S. patent dated August 7, 1917, #1,236,157, in order that the same may meet all the requirements for a successful commercial use.

Another object of the invention is to provide a ventilator of the above type so constructed as to not materially obstruct the flow of air therethrough to the interior of the building, but sufficiently to break up the air currents and thereby insure against drafts.

Still another object of the invention is to provide the ventilator with front wall members angularly arranged so as to better direct the air into the building and made of such material as to offer little obstruction to the entrance of light into the building.

A further object of the invention is to provide the wind closed vibrating slats of the ventilator with novel stop and buffer devices.

A still further object is to provide a ventilator of such construction as to be cheaply and easily manufactured and durable and efficient in operation.

With the above general objects in view and others that will become apparent as the nature of the invention is better understood, the same consists in the novel form, combination and arrangement of parts hereinafter more fully described, shown in the accompanying drawings and claimed.

Figure 1:
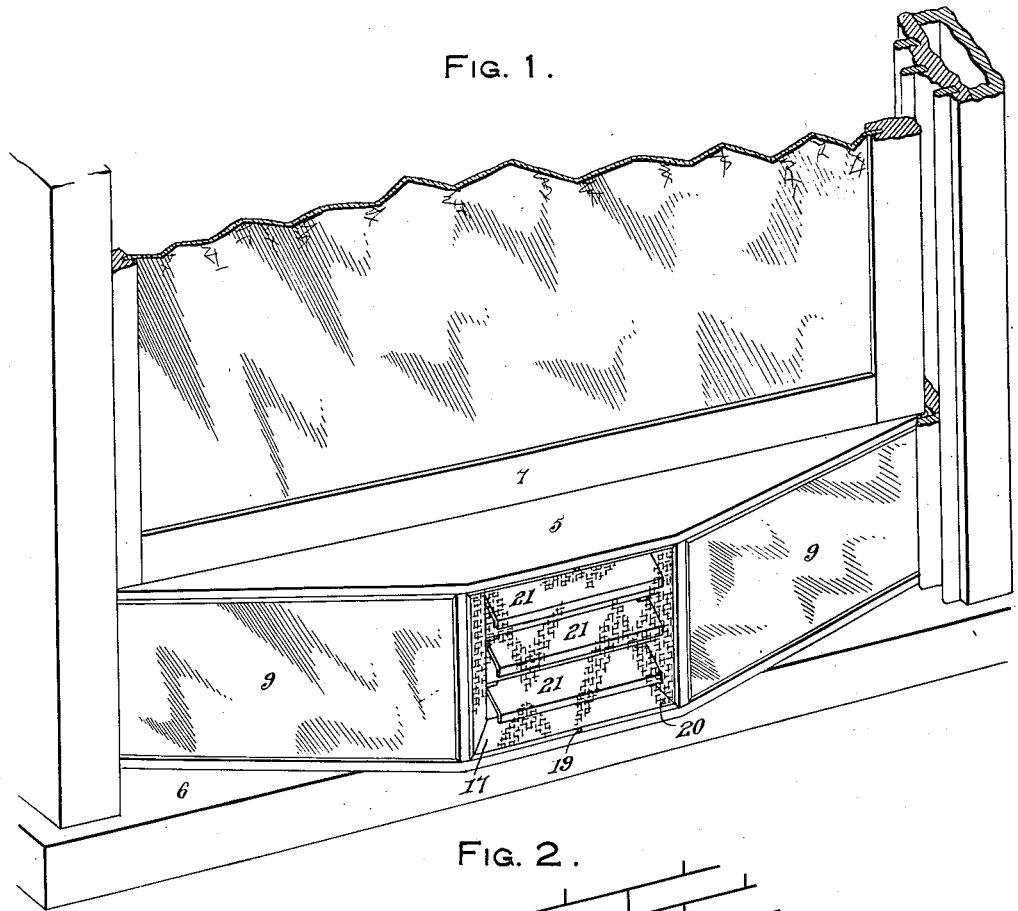
Figure 2:
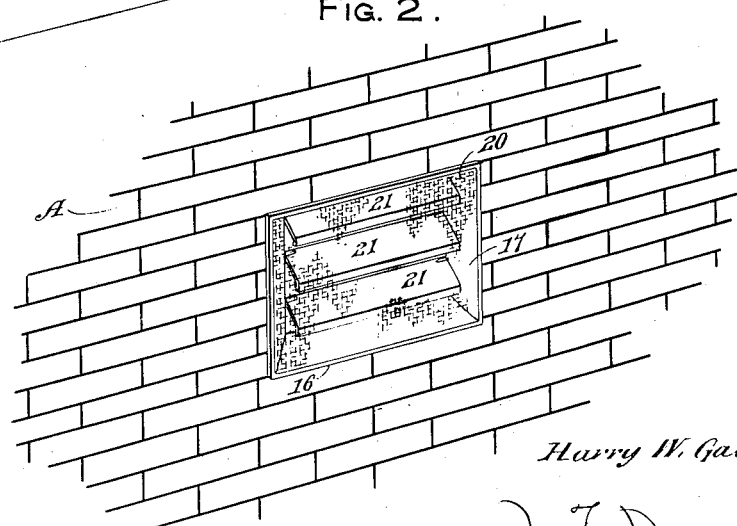
Figure 3:
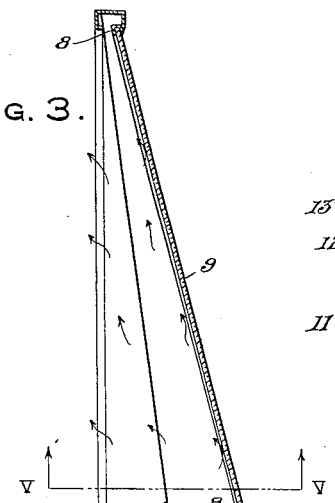
Figure 4:
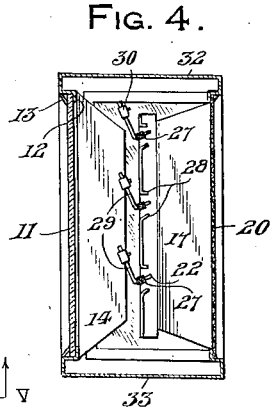
Figure 5:
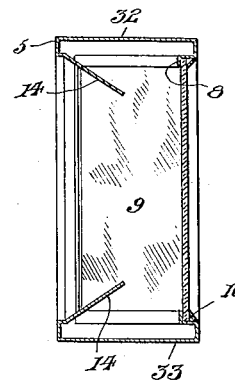
Figure 6:
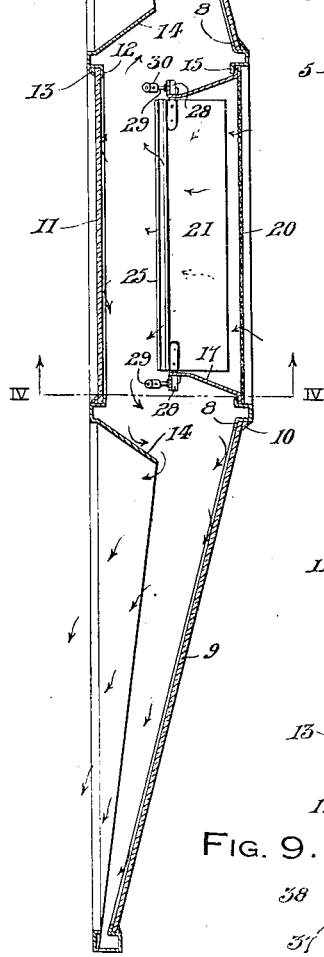
Figure 6:
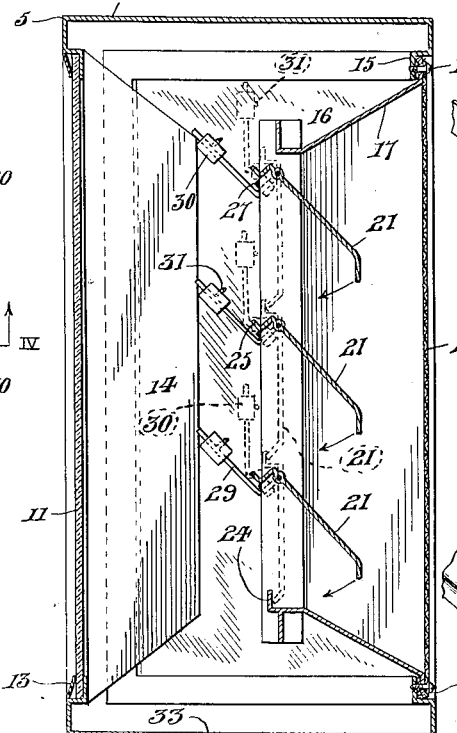

In the drawings, wherein like reference characters indicate corresponding parts throughout the several views, Figure 1 is a fragmentary perspective view of a window with a ventilator constructed in accordance with the present invention operatively associated therewith, Fig. 2 is a view similar to Fig. 1 showing the wind-closed shutter carrying unit, of the ventilator shown in Fig. 1, applied to a wall opening, Fig. 3 is a central longitudinal sectional view of the ventilator shown in Fig. 1, Fig. 4 is a transverse sectional view taken substantially of line IV—IV of Fig. 3, Fig. 5 is a view similar to Fig. 4 taken upon line V—V of Fig. 3, Fig. 6 is an enlarged central transverse sectional view of the device shown in Fig. 1.

Figure 7:
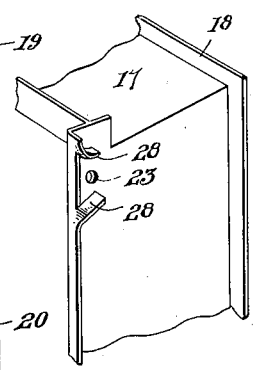
Figure 8:
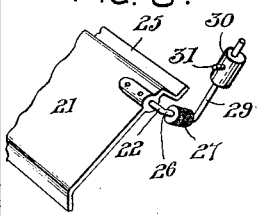
Figure 9:
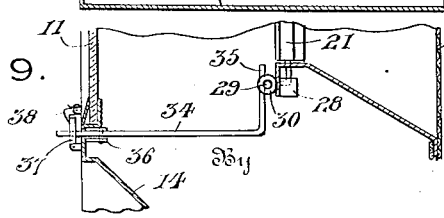
Figure 10:
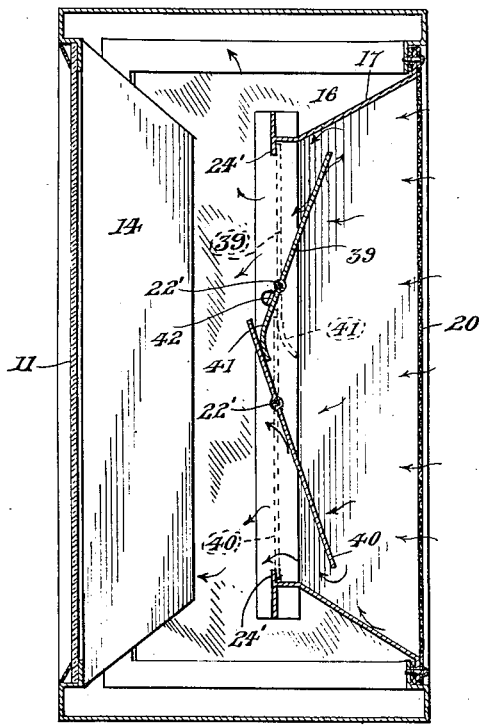

Fig. 7 is a fragmentary perspective view of a corner portion of the frame of the shutter carrying unit, Fig. 8 is a similar view of one end of one of the wind closed shutters or slats, Fig. 9 is a fragmentary detail view in longitudinal section and showing a means for retaining the shutters or slats closed or in an inoperative position, Fig. 10 is a view similar to Fig. 6 with a modified form of shutter construction and arrangement.

Figure 11:
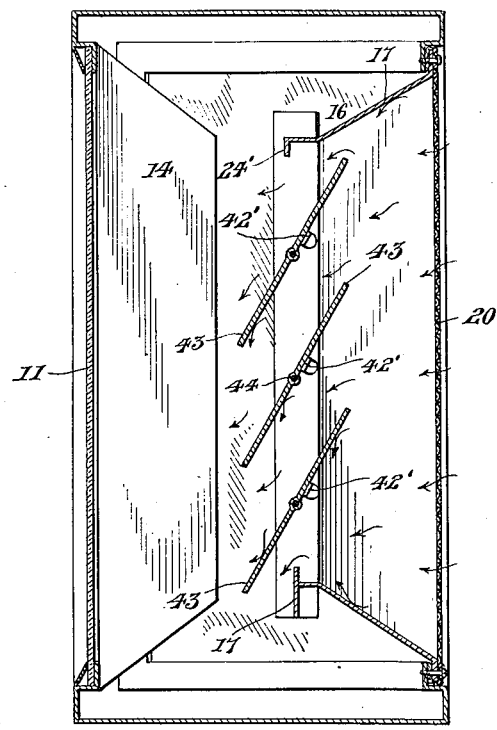
Figure 12:
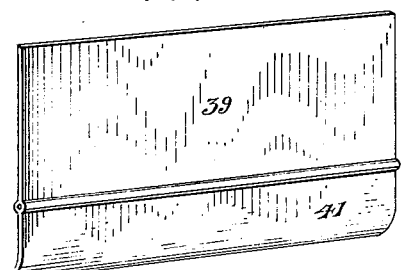
Figure 13:
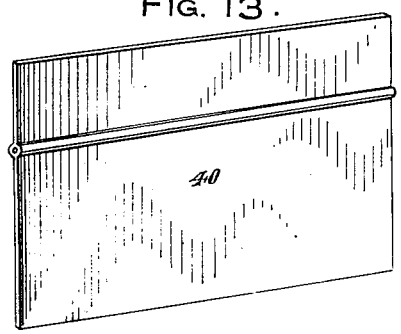
Figure 14:
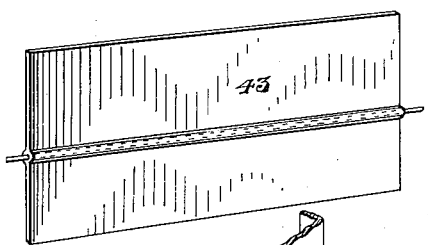
Figure 15:

Fig. 11 is a view similar to Fig. 10 with another form of shutter construction and arrangement, Fig. 12 is a perspective view of the upper shutter of Fig. 10, Fig. 13 is a similar view of the lower shutter of said Fig. 10, Fig. 14 is a similar view of one of the shutters of Fig. 11, and Fig. 15 is a fragmentary perspective view illustrating the formation of the stop lugs on the side frame members of the shutter carrying unit of Fig. 11.

Referring more in detail to the several views, the present ventilator includes a casing 5 which is comparatively long and narrow so as to rest upon a window sill 6 and completely fill the space between said sill and the lower edge of the window sash 7 when the latter is partly raised as shown in Fig. 1. However, it is to be understood that the present invention is not limited in use in this respect as the same may be employed in any opening or at the top of a window.

The frame of the casing 5 is preferably constructed of sheet metal and the device is substantially trapezoid-shaped in bottom and top plan. The frame of the casing is formed or shaped so as to provide shoulders 8 against which the edges of the non-parallel or angularly arranged front wall members 9 are retained by any suitable means such as a securing band 10. The front wall members or panels 9 are preferably glass frosted or otherwise treated so as to be translucent and light diffusing whereby, when the ventilator is disposed as shown in Fig. 1, light may pass through said members 9 into the building to the desired extent. By making the panels 9 of frosted glass or the like, the light is diffused and made less glaring. The central portion of the casing frame for a length substantially equal to the length of the shorter front wall of the ventilator which is parallel therewith is closed by a rear wall member 11, also preferably of light diffusing glass and retained against the frame shoulder 12 by a fastening band or ring 13.

The rear portion of the casing frame is shaped inwardly at each side of the panel or rear wall member 11 to provide a pair of substantially U-shaped wind deflecting members 14, the opposite legs of which gradually taper to a point from their inner to their outer ends. The spaces inclosed by the deflecting members 14 are open so as to provide for the free egress of air therethrough as clearly indicated by arrows in Fig. 3.

The casing frame of the ventilator at the front central portion thereof which is parallel with the panel or rear wall member 11 is shouldered as at 15 for reception of the shutter carrying unit 16 as clearly shown in Figs. 3 and 6. The shutter carrying unit 16 comprises a substantially rectangular frame 17 whose front edge is outwardly flanged as at 18 to engage the shoulder 15 and to be secured thereagainst by means of suitable fastening screws 19 or the like. The opening bounded by the shoulder 15 of the casing frame is closed by a substantially rectangular sheet of reticulated fabric 20 such as wire screen which has its edges secured to the continuous flange 18 of the frame 17 by means of the screws 19. The screen 20 thus also constitutes a dust excluding closure for the mouth or inlet of the shutter carrying unit. A plurality of superimposed shutters 21 are arranged transversely of the frame 17 at the rear thereof and these shutters are so arranged and constructed as to substantially close the passage through the frame 17 when the same are vertically disposed as indicated by dotted lines in Fig. 6. Each shutter is provided at its ends with a shaft 22 which projects through an aperture 23 so as to pivotally suspend the shutter for vertical swinging movement within the frame 17. The lower portion of the frame 17 is provided with an upstanding flange 24 adapted to be engaged by the lower end of the lowermost shutter 21 so as to limit the swinging movement of the latter inwardly to substantially a vertical position. Similarly the upper edges of the shutters 21 are flanged as at 25 so that the shutter immediately above will have its lower edge abut said flange 25 when vertically disposed. The shafts 22 of the shutters are bent rearwardly at an angle to provide a relatively short portion 26 upon which suitable rubber sleeves or buffers 27 are mounted so as to strike the opposed stop lugs 28 which are formed upon the flanged inner edges of the sides of the frame 17 by slitting and bending as shown in Fig. 7. The buffer 27 will engage the lower stop lug 28 when the shutter associated therewith is in outwardly swung position as seen in Fig. 6, and will engage the upper stop lug 28 when the shutter is vertically disposed as indicated by dotted lines also in Fig. 6. The shafts 22 are further bent at their ends at an angle to the portions 26 to provide end portions 29 upon which suitable weights 30 are slidably mounted for normally moving the shutters to their inclined open positions as shown by full lines in Fig. 6. The weights 30 may be slid along the portions 29 to the desired position and there secured by set screws 31 so as to regulate the amount of air pressure necessary to swing the shutters to their vertical closed positions.

It will be seen that by unscrewing the screws 19 sufficiently to release the same from the casing shoulder 15, the shutter carrying unit 16 may be bodily removed for cleaning, repair or the like. Also, this unit may be employed alone in a wall opening as shown in Fig. 2, the opening in the wall A being made so that the unit may fit thereinto substantially flush with the outer surface thereof but with the flange 18 bearing against said outer surface at the margin of the wall opening.

The sheet metal frame of the casing 5 forms substantially flat trapezoid shaped top and bottom walls 32 and 33 respectively which are imperforate and opaque.

It will thus be seen that when the ventilator above described is employed as shown in Fig. 1, the panels or wall members 9 and 11 will permit the entrance of considerable necessary and desirable light, while air may readily pass through the interstices of the screen member 20 through the frame 17 and under the lower edges of the shutters 21 where the same will strike against the rear wall panel 11 and be deflected laterally in opposite directions against the relatively wide ends of the deflectors 14. The air will then be deflected forwardly and laterally against the front wall panels 9 where it may pass and be directed rearwardly into the building. By this arrangement, it will be seen that slight air currents will be permitted to enter the ventilator casing and there broken up so as to cause little, if any, draft or drafts in the building while permitting considerable fresh air to be admitted. Should a gust of wind come up, the same will strike against the front faces of the shutters 21 and swing the same inwardly to their dotted line positions of Fig. 6 wherein the central entrance to the casing is thus closed and the gust of wind thereby prevented from entering the building.

It is sometimes found desirable to retain the shutters 21 in their vertical closed positions so that the ventilator is temporarily rendered inoperative, and for this purpose I may provide any suitable means for holding the shutters vertically disposed, an example of which means is shown in Fig. 9. This means resides in providing a rod 34 for each shutter extending transversely of the casing and through the frame of the casing at one end of the panel 11 with its inner end angularly bent as at 35 so as to engage the portion 29 of the adjacent shaft 22. The rod 34 is preferably pivotally mounted as at 36 so as to have its end 35 swung downwardly out of engagement with the shaft portion 29 or upwardly into engagement with the latter, as desired, the rod 34 being so arranged and proportioned as to engage the shaft portion 29 when the shutter which carries the same is vertically disposed. It will thus be seen that the shutters can be retained closed. In order to hold the rod 34 in its position wherein the shutter is retained closed, I pivotally mount a bar 37 upon the casing frame adjacent to the outer end of the rod 34 so that said bar 37 may be swung to extend transversely above the rod 34 and hold the same against tilting downwardly to an inoperative position. A suitable catch 38 may be provided to hold the bar 37 in position overlying the outer end of the rod 34. It is, of course, to be understood that I may employ various means for retaining the shutters closed and the means herein disclosed is merely shown and described by way of example.

In Fig. 10 I show a modified form of shutter construction and arrangement for the shutter carrying unit 16. In this figure there are merely shown two shutters, the upper one being indicated at 39 and the lower one at 40. These shutters are also pivoted for vertical swinging movement upon shafts 22', but instead of providing the shutters with weights 30 as before described, the upper shutter 39 is pivotally mounted below its longitudinal center so that the upper portion thereof is the heavier. The lower portion of the shutter 39 is outwardly curved as at 41 so as to bear against the upper portion of the shutter 40. It will thus be seen that the shutter 39 normally tilts outwardly to the full line normal position thereof as shown in Fig. 10, and in so doing the curved lower portion 41 thereof engages the upper portion of the shutter 40 and tilts the latter upwardly to a forwardly and downwardly inclined open position. A suitable stop lug 42 is stamped from the side of the frame 17 which is engaged by the lower portion of the shutter 39 for limiting the opening or tilting movement of the latter. Suitable stop flanges 24' are provided upon the top and bottom of the frame 17 respectively for engagement by the upper edge of the shutter 39 and the lower edge of the shutter 40 for limiting the inward swinging movement of the shutters to a substantially vertical closed position. The operation of this form of shutter construction is substantially identical with that of the previously described form in that air may pass above and below the shutters until a gust of wind comes up. This gust of wind strikes the outer faces of the shutters and swings the same to their closed positions. Obviously, the shutters will again tilt for opening as soon as the gust of wind dies out.

A still further form of shutter construction and arrangement is illustrated in Figs. 11 and 14. In these figures the shutter carrying unit 16 is provided with a number of similar shutters 43 which are substantially flat and each of which are pivoted to swing upon a horizontal pivot 44 positioned below the horizontal center thereof. The upper portions of the shutters 43 are thus heavier and cause the shutters to normally seek an inclined position wherein the same are open as shown by full lines in Fig. 11. Suitable stop lugs 42' are stamped from the sides of the frame 17 of the shutter carrying unit so as to limit the opening movement of the shutters 43, and the flanges 24' of the casing 17 limit the closing movement of the shutters 43 to a substantially vertical position.

From the foregoing description, it will be seen that I have provided a greatly improved ventilator which is of such practical construction as to meet all the requirements for a successful commercial use and which embodies a detachable shutter carrying unit which is bodily removable for repairing and cleaning and capable of being used alone in wall openings or the like.

It is believed that the construction and operation of the invention as well as the advantages thereof will be readily understood and appreciated by those skilled in the art from the foregoing description.

While the preferable embodiments of the invention are herein shown and described, it will be understood that minor changes may be made therein without departing from the spirit and scope of the invention as claimed.

What I claim as new is:—

1. A ventilator of the class described including a casing having front and rear walls with a central air inlet in its front wall and air outlets at the opposite ends of its rear wall, normally open wind closed shutters controlling the flow of air into the casing through said inlet, and inwardly projecting air deflecting members surrounding said outlet openings, said air deflecting members being comparatively wide at their inner ends and gradually tapering to narrowed outer ends.

2. In a ventilator of the class described, a casing having front and rear walls with a central air inlet in its front wall and air outlets at the opposite ends of its rear wall, and a removable shutter carrying unit extending into the casing through the inlet opening thereof, the shutters of said shutter carrying unit being normally open and automatically closable by air currents.

3. In a ventilator of the class described, a casing having front and rear walls with a central air inlet in its front wall and air outlets at the opposite ends of its rear wall, and a removable shutter carrying unit extending into the casing through the inlet opening thereof, the shutters of said shutter carrying unit being normally open and automatically closable by air currents, said casing having panels in the opposite end portions of its front wall and in the central portion of its rear wall which permit the passage of light therethrough.

4. A ventilator of the class described comprising a casing of substantially trapezoid shape in plan and having front and rear walls with an air inlet in that portion of its front wall which is parallel to its rear wall, normally open and wind closed shutters for controlling the flow of air through the inlet into the casing, angularly arranged front wall members at the opposite sides of said air inlet, the rear wall of said casing being provided with outlets at the end portions thereof, and air deflecting members extending inwardly of the casing from said rear wall thereof.

5. A ventilator of the class described comprising a casing of substantially trapezoid shape in plan and having front and rear walls with an air inlet in that portion of its front wall which is parallel to its rear wall, normally open and wind closed shutters for controlling the flow of air through the inlet into the casing, angularly arranged front wall members at the opposite sides of said air inlet, the rear wall of said casing being provided with outlets at the end portions thereof, and air deflecting members extending inwardly of the casing from said rear wall thereof, said air deflecting devices each comprising a U-shaped member comparatively wide at its inner end and tapering toward its outer end.

6. A ventilator comprising a casing of substantially trapezoid shape and including a sheet metal frame having angularly related front wall members with a central air inlet therebetween, a rear wall member at the central portion of the casing opposite said air inlet, the rear of said casing being open at the opposite sides of said rear wall member, and normally open wind closed shutters for controlling the flow of air through the inlet into said casing.

7. A ventilator comprising a casing of substantially trapezoid shape and including a sheet metal frame having angularly related front wall members with a central air inlet therebetween, a rear wall member at the central portion of the casing opposite said air inlet, the rear of said casing being open at the opposite sides of said rear wall member, normally open wind closed shutters for controlling the flow of air through the inlet into said casing, and air deflecting members surrounding the openings at the opposite sides of said rear wall member, said angularly related front wall members and the air deflecting members providing a circuitous course for the flow of air from the inlet through and out of the casing, and said angularly related front wall members serving to direct the air in opposite directions in an angular direction to the transverse axis of the ventilator.

8. A ventilator comprising a casing of substantially trapezoid shape and including a sheet metal frame having angularly related front wall members with a central air inlet therebetween, a rear wall member at the central portion of the casing opposite said air inlet, the rear of said casing being open at the opposite sides of said rear wall member, normally open wind closed shutters for controlling the flow of air through the inlet into said casing, air deflecting members surrounding the openings at the opposite sides of said rear wall member, said angularly related front wall members and the air deflecting members providing a circuitous course for the flow of air from the inlet through and out of the casing, and said angularly related front wall members serving to direct the air in opposite directions in an angular direction to the transverse axis of the ventilator, said front and rear wall members being constructed of light transmitting material.

9. A shutter carrying unit for ventilators of the class described comprising a substantially rectangular frame having a plurality of shutters pivoted therein for swinging upon horizontal pivots, the upper shutter normally assuming an open inclined position and bearing upon the other shutter so as to maintain the same also normally open, said shutters being operable by a current of air for closing the passage through said frame through swinging of the shutters to substantially vertical positions, and means to limit the swinging movements of said shutters.

In testimony whereof I affix my signature.

HARRY W. GADDESS.